H. G. DAYTON.
Coffee-Urns.
No. 147,912. Patented Feb. 24, 1874.
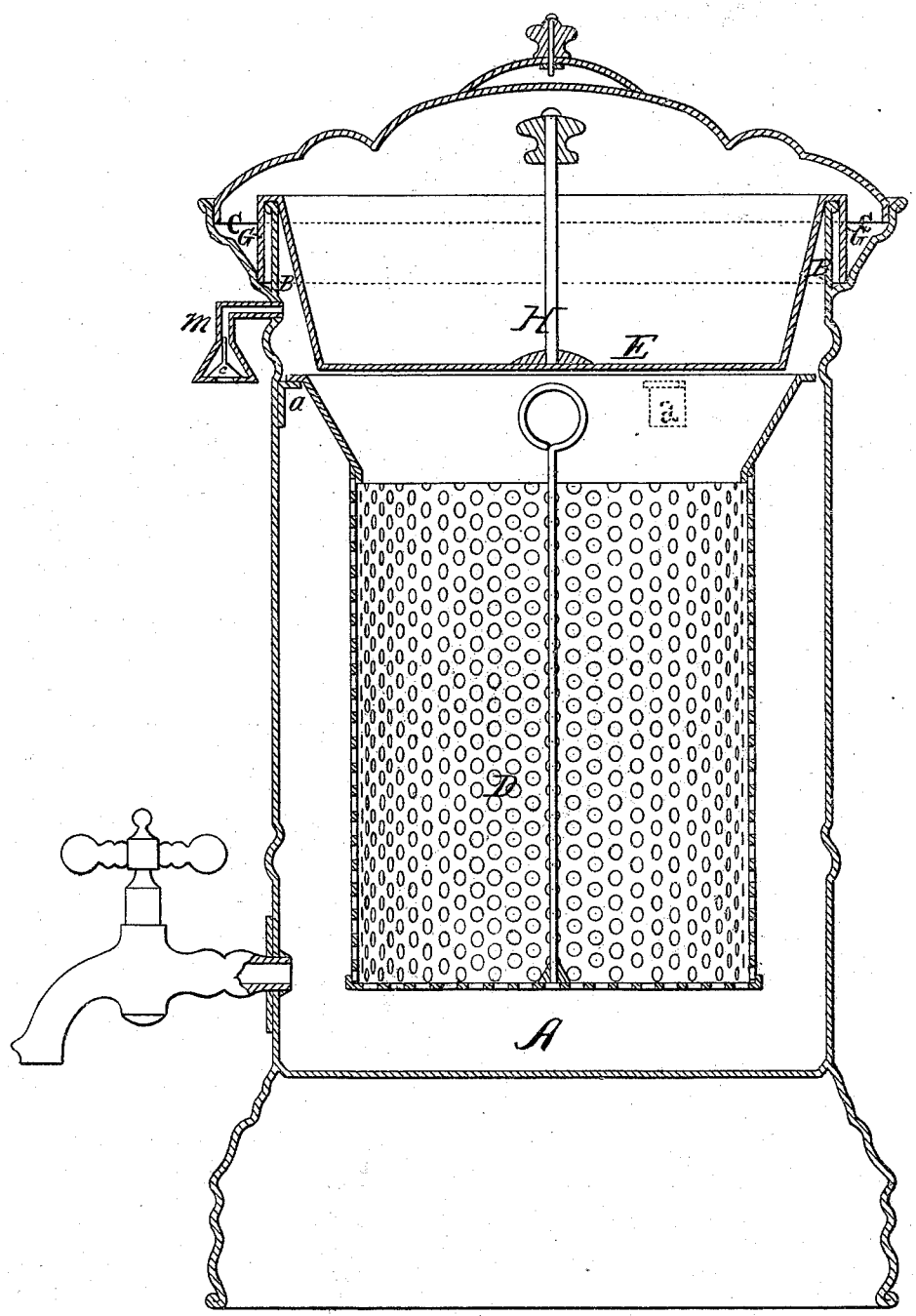
WITNESSES.
Villette Anderson.
G. E. Upham.
INVENTOR.
Henry G. Dayton.
Chipman Hosmer & Co,
Attys.

United States Patent Office.

HENRY G. DAYTON, OF MAYSVILLE, KENTUCKY.

IMPROVEMENT IN COFFEE-URNS.

Specification forming part of Letters Patent No. 147,912, dated February 24, 1874; application filed June 2, 1873.

*To all whom it may concern:*

Be it known that I, HENRY G. DAYTON, of Maysville, in the county of Mason and State of Kentucky, have invented a new and valuable Improvement in Coffee-Pots; and I do hereby declare that the following is a full, clear, and exact description of the construction and operation of the same, reference being had to the annexed drawings making a part of this specification, and to the letters and figures of reference marked thereon.

The figure of the drawings is a representation of my improved coffee-pot.

My invention relates to the preparation of coffee as a beverage; and consists in the construction of the vessel for preparing ground coffee for such use, as hereinafter described and claimed.

A of the drawings represents the main body of my coffee-boiler, which may be in the form of an urn, as shown, or it may be constructed with a flat bottom to sit upon the range; or it may have a bottom of less diameter than the main body to admit of placing it in an ordinary boiler-hole of a stove. The letter B represents a flange attached, by solder or otherwise, to the main body, near its top, and which encircles the same, thereby forming, in conjunction with said top, a water-chamber extending around the top of the boiler, marked C on the drawings. D represents a perforated basket or strainer, in which the coffee is usually placed for boiling, the extended suspending-arms of which rest on lugs $a$, attached to the inside of the boiler, as shown. This basket is removable at will. E represents a cup constructed with inverted conical sides or walls, and a vertical flange extending downward, marked G, thereby forming a chamber between said flange and the main walls of the cup. H represents a rod attached to the bottom of the cup E, having a knob at its top. This rod and knob serve as means for removing or adjusting the cup at will. The cup E is placed upon the top of the coffee-vessel by passing its flange G over the same. It will readily be perceived that when the cup E is in position a trough or water-chamber is formed between its flange and the flange B, extending around the top of the coffee-vessel. This trough is designed to be filled with water to form a joint and prevent the escape of aroma from the coffee while in process of being boiled. The letter M represents a spout leading from the exterior to the interior of the main vessel. In this spout I arrange a valve, $c$, to admit air when the coffee is being drawn for use.

It will be observed that the flange of the cup E is utilized in forming a water-seal, and that the beveled shape of said cup serves to form an annular chamber between it and the wall of the main vessel, thereby providing a proper recess above the fluid for the introduction of the air-pipe M and its drop-valve. Heretofore such pipes have been arranged upon the cover of the vessel, and as a consequence the valve has been held in position by a spring. By my arrangement such spring is dispensed with.

My device is operated as follows: The basket D is placed in position and the ground coffee placed therein. Sufficient water is then poured into said basket. The chamber C is then filled with water, and the cup E applied in the manner described. I next fill the cup E with cold water or ice, and place the main vessel upon or within the stove or fire. As the water inside the vessel boils, the steam arising therefrom is condensed by the action of the cold water or ice in the cup E. By these means the coffee is cooked and made ready for use without the loss of any of its valuable aroma.

Tea and other herbs may be prepared as a beverage by the same apparatus and all their valuable properties preserved.

What I claim as new, and desire to secure by Letters Patent, is—

In a coffee-vessel, the combination of the annular chamber formed between the walls of the vessel and the beveled cup E with the air-tube M and the pendent valve $c$, substantially as and for the purpose specified.

In testimony that I claim the above I have hereunto subscribed my name in the presence of two witnesses.

HENRY G. DAYTON.

Witnesses:
 GEORGE E. UPHAM,
 CHAS. B. STEELE.